United States Patent
Oh et al.

(10) Patent No.: US 6,629,715 B2
(45) Date of Patent: Oct. 7, 2003

(54) METHOD FOR ENGAGING AN ADJUSTABLE BOLSTER ON A SEAT

(75) Inventors: Pahngroc Oh, Ann Arbor, MI (US); Scott A. Funke, Farmington Hills, MI (US); Stephen M. Stachowski, Canton, MI (US); Kevin J. Pavlov, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/182,108

(22) PCT Filed: Nov. 27, 2001

(86) PCT No.: PCT/US01/44330
§ 371 (c)(1), (2), (4) Date: Jul. 24, 2002

(87) PCT Pub. No.: WO02/43531
PCT Pub. Date: Jun. 6, 2002

(65) Prior Publication Data
US 2003/0107231 A1 Jun. 12, 2003

Related U.S. Application Data
(60) Provisional application No. 60/253,317, filed on Nov. 27, 2000.

(51) Int. Cl.[7] ............................. B60N 2/00; B60N 2/24; B60N 2/50
(52) U.S. Cl. ....................................................... 296/63
(58) Field of Search ................. 296/63, 65.01; 701/45; 297/452.6, 284.9, 284.11, 284.4, 452.53, 284.1; 280/755, 753

(56) References Cited

U.S. PATENT DOCUMENTS

| | | | |
|---|---|---|---|
| 3,452,834 A | | 7/1969 | Gaut |
| 3,600,037 A | * | 8/1971 | Lohr .................... 297/284.11 |
| 4,500,136 A | * | 2/1985 | Murphy et al. .......... 297/284.9 |
| 4,607,887 A | * | 8/1986 | Vail ........................ 297/284.9 |
| 4,722,550 A | | 2/1988 | Imaoka et al. |
| 4,880,271 A | * | 11/1989 | Graves ..................... 297/284.4 |
| 4,924,162 A | * | 5/1990 | Sakamoto et al. ........ 297/284.9 |
| 5,130,622 A | | 7/1992 | Takizawa et al. |
| 5,263,765 A | * | 11/1993 | Nagashima et al. ... 297/284.11 |
| 5,320,409 A | * | 6/1994 | Katoh et al. ............. 297/284.9 |
| 5,490,706 A | | 2/1996 | Totani |
| 5,505,520 A | * | 4/1996 | Frusti et al. ............. 297/284.4 |
| 5,556,160 A | | 9/1996 | Mikami |
| 5,707,109 A | * | 1/1998 | Massara et al. .......... 297/284.9 |
| 5,743,591 A | | 4/1998 | Tame |
| 5,806,046 A | * | 9/1998 | Curran et al. .................. 705/27 |
| 5,857,743 A | * | 1/1999 | Ligon et al. ............. 297/284.9 |
| 5,934,749 A | * | 8/1999 | Pond et al. ............... 297/284.9 |
| 5,975,508 A | | 11/1999 | Beard |
| 5,975,629 A | * | 11/1999 | Lorbiecki ................ 297/284.6 |
| 6,019,428 A | * | 2/2000 | Coffield .................... 297/284.9 |
| 6,024,378 A | * | 2/2000 | Fu ............................. 280/735 |
| 6,037,731 A | * | 3/2000 | Fruehauf et al. ......... 297/284.1 |
| 6,056,079 A | | 5/2000 | Cech et al. |
| 6,059,253 A | | 5/2000 | Koutsky et al. |
| 6,088,642 A | * | 7/2000 | Finkelstein et al. ...... 297/284.1 |
| 6,120,082 A | | 9/2000 | Vandermolen |
| 6,122,568 A | * | 9/2000 | Madau et al. .................. 701/1 |
| 6,129,419 A | * | 10/2000 | Neale ...................... 297/284.6 |
| 6,182,783 B1 | | 2/2001 | Bayley |
| 6,193,297 B1 | | 2/2001 | Vandermolen |
| 6,203,105 B1 | * | 3/2001 | Rhodes, Jr. ............... 297/284.1 |
| 6,283,552 B1 | * | 9/2001 | Halse et al. .............. 297/440.1 |
| 6,474,738 B1 | * | 11/2002 | Ratza et al. ................ 297/337 |

FOREIGN PATENT DOCUMENTS

| | | |
|---|---|---|
| DE | 19823058 A1 | 12/1999 |
| JP | 63315342 | 12/1988 |

OTHER PUBLICATIONS

PCT Publication, WO 00/12350, Mar. 9, 2000.

* cited by examiner

*Primary Examiner*—Kiran Patel
(74) *Attorney, Agent, or Firm*—Brinks Hofer Gilson & Lione

(57) ABSTRACT

A method for adjusting a bolster (22) on a seat (10) involves sensing upper and lower limits of several vehicle parameters to determine bolster condition.

19 Claims, 3 Drawing Sheets

METHOD FOR ENGAGING AN ADJUSTABLE BOLSTER ON A SEAT

CROSS-REFERENCE TO RELATED APPLICATIONS

This application is a U.S. national stage filing of international application No. PCT/US01/44330, filed Nov. 27, 2001 and claims priority to U.S. provisional application No. 60/235,317, filed Nov. 27, 2000.

TECHNICAL FIELD

The present invention relates generally to a method for engaging an adjustable bolster on a seat of a vehicle and, more particularly, to a method for engaging an adjustable bolster based on multiple parameters with multiple thresholds.

BACKGROUND

Although appearing in more printed publications than in actual vehicles, the concept of a seating system having an automatically adjustable bolster activated by a control unit based upon particular parameters is well known. U.S. Pat. No. 4,924,162, which is hereby incorporated in its entirety by this reference, discloses such seating system. As shown in FIG. 3, the seating systems of the prior art are activated by a control unit based upon two parameters, typically steering wheel angle and vehicle speed, each with a single threshold. When the vehicle speed reaches a predetermined threshold and the steering wheel angle reaches a predetermined threshold, the engagement of the adjustable bolster is increased.

Extensive testing of these seating systems, however, reveal that the single threshold aspect for the parameters causes less-than-ideal activation of the adjustable bolster, which may reduce customer satisfaction of the relatively expensive seating system. For this reason, there is a need in the art of seating systems to provide an improved activation of the adjustable bolster.

DESCRIPTION OF THE PREFERRED METHOD

The following description of the preferred method is not intended to limit the invention to the preferred method, but rather to enable any person skilled in the art of vehicle seats to make and use this invention.

Figure 1:
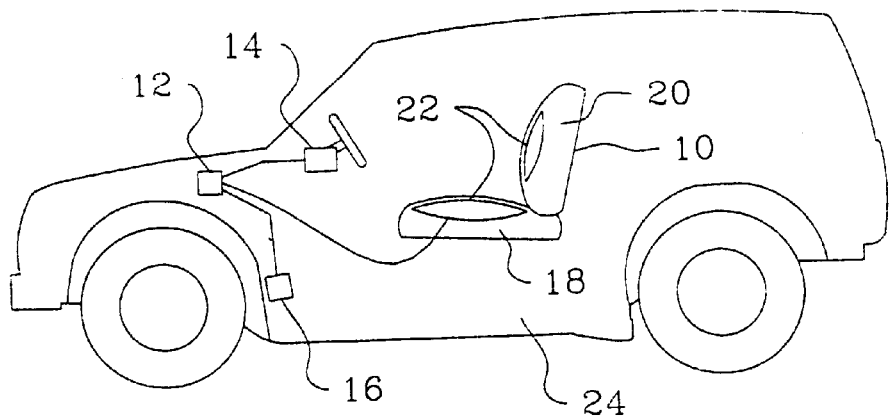
FIG. 1 is a side view of a seat in a vehicle with an adjustable bolster engageable by the preferred method of the invention.
Figure 2:
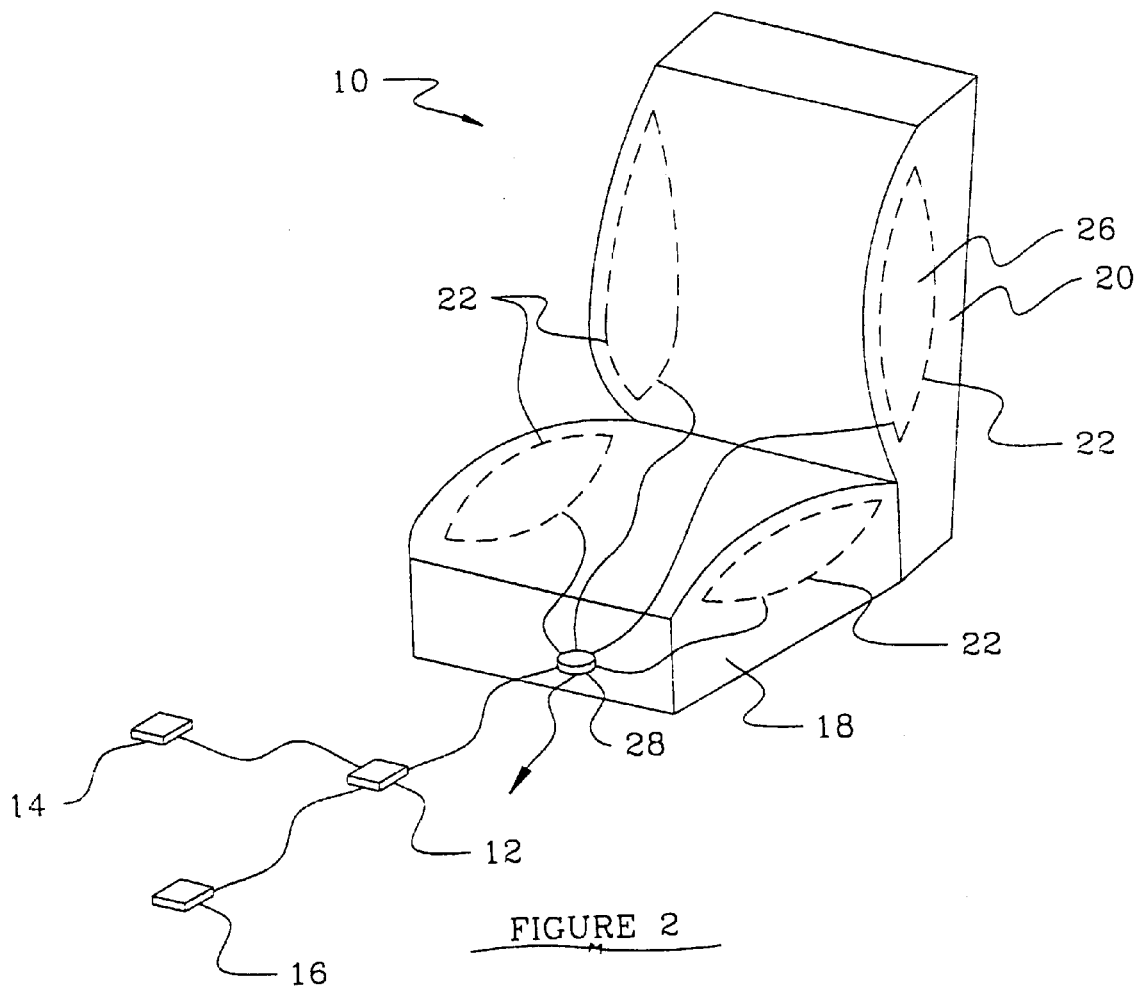
FIG. 2 is a perspective view of the seat of FIG. 1.
Figure 3:
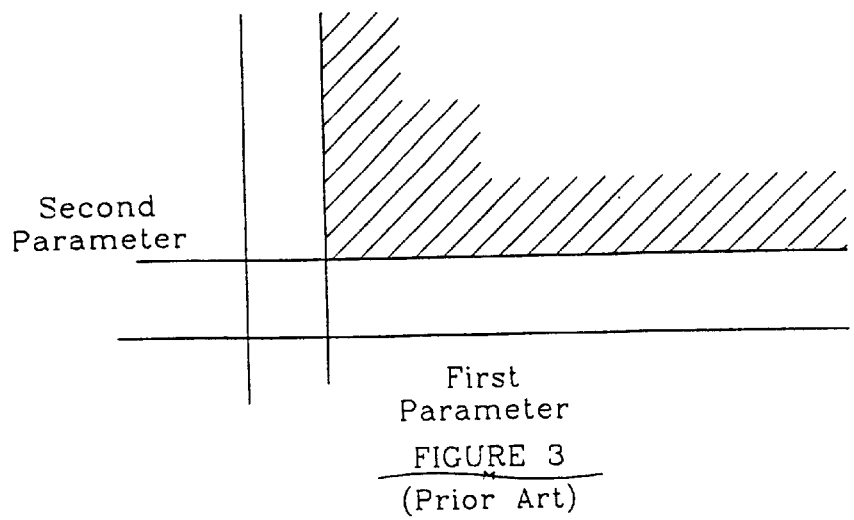
FIG. 3 is a graphical representation of the two parameter with single threshold activation of the conventional method of the prior art.

As shown in FIGS. 1 and 2, the preferred method of the invention is preferably used with a seat 10, a control unit 12, a first sensor 14, and a second sensor 16. The seat 10, which functions to support a passenger or driver includes a seat section 18, a back section 20, and an adjustable bolster 22. Although the preferred method has been specifically designed for engaging the adjustable bolster 22 on the seat 10 of a vehicle 24, the preferred method may be designed and used for engaging an adjustable bolster on a seat in other suitable environments, such as in a watercraft or in an aircraft.

As shown in FIG. 2, the seat section 18 and the back section 20 of the seat 10 are preferably made in a conventional manner which includes providing a metal frame, a foam cushion, and a cloth or leather trim (not shown). The seat section 18 and the back section 20 may alternatively be made in any suitable manner. The back section 20 is preferably connected to the seat section 18 with a conventional angle-adjustable mechanism (not shown), but may alternatively be connected with any suitable device. Likewise, the seat section 18 is preferably connected to the vehicle 24 with a conventional position-adjustable mechanism (not shown), but may alternatively be connected with any suitable device.

The adjustable bolster 22 of the seating system, which functions to provide side support for the driver or passenger on the seat 10 of the vehicle 24 during a situation of lateral acceleration, is preferably made in a conventional manner, which includes an inflatable bladder 26 and a pneumatic pump 28. The adjustable bolster 22 may alternatively be made in any suitable manner, such as with a bladder inflatable by a hydraulic pump, or with a paddle adjustable with a motor. The inflatable bladder 26 is preferably connected to the outer edges of the seat section 18 and to the outer edges of the back section 20 with conventional fasteners (not shown), but may alternatively be connected to the seat section 18 and the back section 20 with any suitable fastener. The seat 10 preferably includes four adjustable bolsters 22, but may alternatively include one or more adjustable bolsters 22 at any suitable location. The pneumatic pump 28 is preferably located under the seat section 18 of the seat 10, but may alternatively be located at any suitable location in the vehicle 24.

The control unit 12, which functions to receive and process data regarding the first parameter and the second parameter and to output an appropriate signal to the adjustable bolster 22, is preferably made in a conventional manner, which includes a microprocessor and a memory device (not shown). The control unit 12 may alternatively be made in any other suitable manner. The control unit 12 is preferably located within a floor of the vehicle 24, but may alternatively be located in any suitable location in the vehicle 24.

The sensing of the first parameter and the second parameter is preferably accomplished by the first sensor 14 and the second sensor 16, respectively. In one version of the preferred method, the first parameter includes a steering angle of a steering device of the vehicle 24, while the second parameter includes a speed of the vehicle 24. In a second version of the preferred method, the first parameter includes a lateral acceleration of the vehicle 24, while the second parameter includes a yaw rate of the vehicle 24. In both versions of the preferred method, two parameters of the vehicle 24 are used to approximate the situations in which the driver or passenger on the seat 10 of the vehicle 24 may prefer or need to have an increased engagement of the adjustable bolsters 22. The increased engagement of the adjustable bolsters 22 may allow the driver or passenger on the seat 10 to better react against the centrifugal forces induced by a turn or the lateral acceleration induced by the road. In the first version of the preferred method, the first sensor 14 is a conventional steering wheel angle sensor coupled to the steering wheel of the vehicle 24, while the second sensor 16 is a conventional speed sensor connected to the wheels of the vehicle 24. In the second version of the preferred method, the first sensor 14 is a conventional lateral acceleration sensor, while the second sensor 16 is a conventional yaw rate sensor, both located in any suitable location within the vehicle 24. In alternative versions of the preferred method, the first parameter and the second parameter may include any suitable combination of parameters and any suitable combination of sensors.

Figure 4:
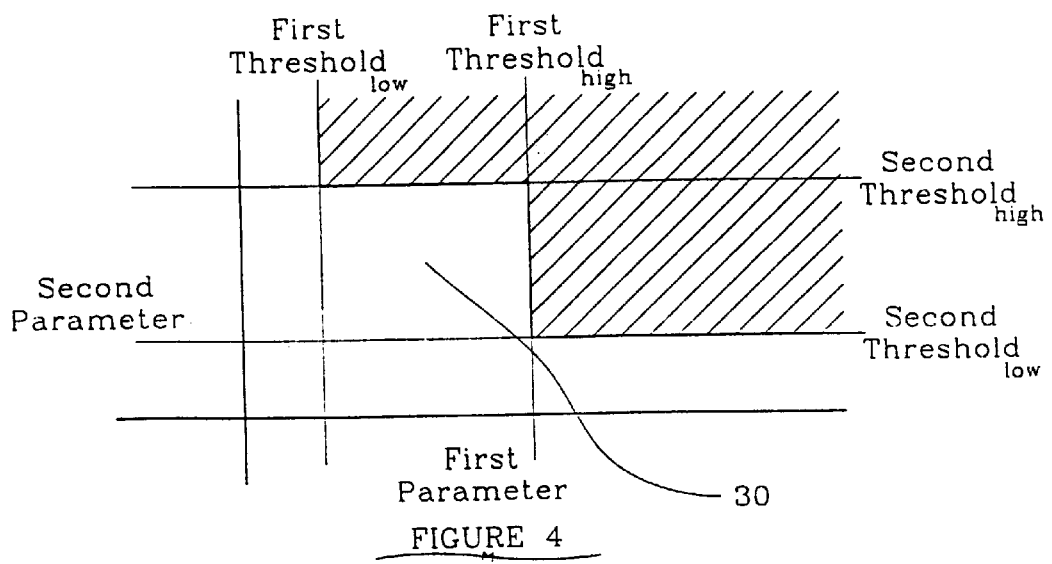
FIGS. 4 and 5 are graphical representations of the two parameter with multiple threshold activation of the preferred method of the invention.

As performed in the prior art, the preferred method of the invention activates the adjustable bolster 22 on the seat 10 of the vehicle 24 based on two parameters. Unlike the prior art, however, the preferred method activates the adjustable bolster 22 based on multiple thresholds of these parameters. As shown in FIG. 4, the activation of the adjustable bolster 22 is based on a first threshold$_{low}$ for the first parameter, a first threshold$_{high}$ for the first parameter, a second threshold$_{low}$ for the second parameter, and a second threshold$_{high}$ for the second parameter. The first threshold$_{low}$<first threshold$_{high}$ and the second threshold$_{low}$<second threshold high. Based on the preferred method, if the first parameter≧first threshold$_{low}$ and the second parameter≧second threshold$_{high}$, the control unit 12 will send a signal to the adjustable bolster 22 to increase the engagement. The control unit 12 will also send a signal to the adjustable bolster 22 to increase the engagement if the first parameter≧first threshold$_{high}$ and the second parameter≧second threshold$_{low}$. In this manner, there is a non-engagement region 30 where first threshold$_{low}$<first parameter<first threshold$_{high}$ and second threshold$_{low}$<second parameter<second threshold$_{high}$, in which the control unit maintains the engagement, and does not increase, the engagement of the adjustable bolster.

Figure 5:
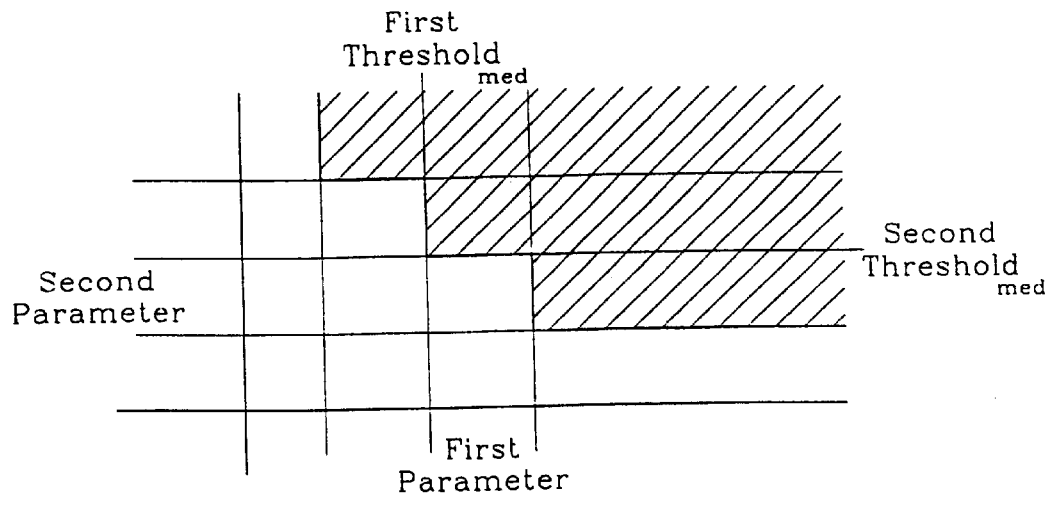

Activation of the adjustable bolsters may be based upon more than just two thresholds for the first parameter and the second parameter. As shown in FIG. 5, activation is also based on a first threshold$_{med}$ for the first parameter and a second threshold$_{med}$ for the second parameter. The first threshold$_{low}$<first threshold$_{med}$<first threshold$_{high}$ and the second threshold$_{low}$<second threshold$_{med}$<second threshold$_{high}$. In this version of the preferred method, the control unit also sends a signal to the adjustable bolster to increase the engagement if the first parameter≧first threshold$_{med}$ and the second parameter≧second threshold$_{med}$. In further versions of the preferred method, activation may be based on dozens of thresholds for the first parameter and the second parameter, such that the graphical representation of the thresholds approaches a smoothly curved line.

Figure 6:
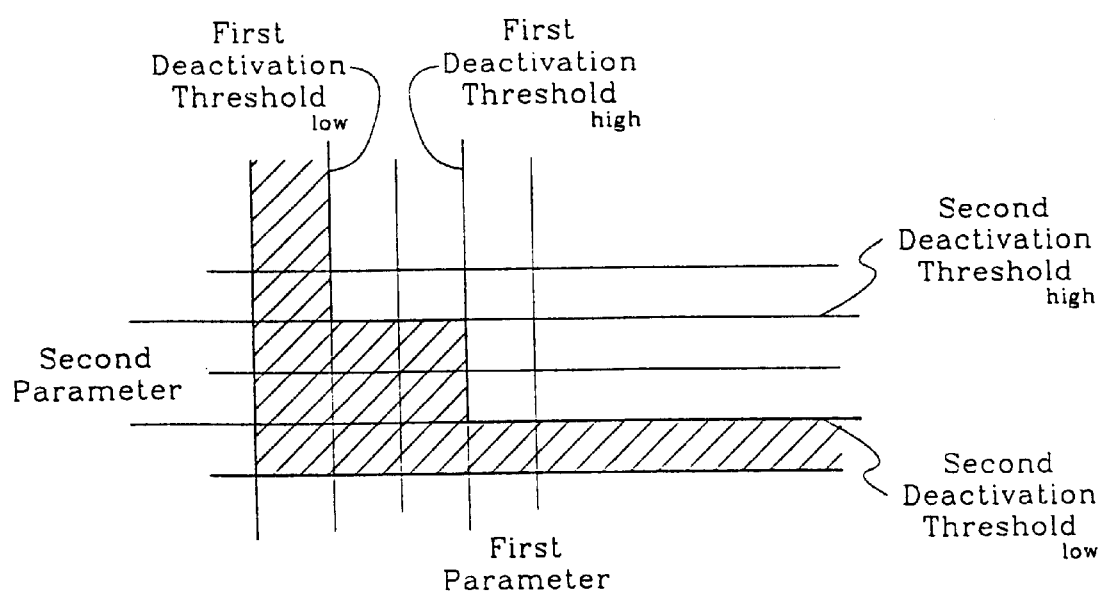
FIG. 6 is a graphical representation of a two parameter with multiple threshold deactivation of the preferred method of the invention.

In another aspect of the preferred method, as shown in FIG. 6, the engagement of the adjustable bolsters is decreased based on different thresholds. The decrease of the bolsters may be preferred or needed by the driver or passenger on the seat of the vehicle for comfort or for ingress into and egress from the seat. The preferred method includes a so-called hysteresis affect for the decrease of the engagement of the adjustable bolsters. As such, a first deactivation threshold$_{low}$<first threshold$_{low}$ and a first deactivation threshold$_{high}$<first threshold$_{high}$ for the first parameter, and a second deactivation threshold$_{low}$<second threshold$_{low}$ and a second deactivation threshold$_{high}$<second threshold$_{high}$ for the second parameter. In the preferred method, the control unit sends a signal to decrease the engagement of the adjustable bolster if the first parameter≦first deactivation threshold$_{low}$, or if the second parameter≦second deactivation threshold$_{low}$, or if the first parameter=first deactivation threshold$_{high}$ and the second parameter≦second deactivation threshold$_{high}$.

The multiple thresholds, including the first threshold$_{low}$, first threshold$_{med}$, first threshold$_{high}$, second threshold$_{low}$, second threshold$_{med}$, second threshold$_{high}$, first deactivation threshold$_{low}$, first deactivation threshold$_{high}$, second deactivation threshold$_{low}$, and second deactivation threshold$_{high}$, are preferably stored within the memory device of the control unit. These thresholds are preferably set by the supplier or manufacturer of the seat, but may alternatively be set or modified by the driver or passenger of the vehicle. Further, the thresholds are preferably constant, but may alternatively be adaptive to the preferences of a particular driver or passenger.

As any person skilled in the art of seating systems will recognize from the previous detailed description and from the figures and claims, modifications and changes can be made to the preferred method of the invention without departing from the scope of this invention defined in the following claims.

We claim:

1. A method for engaging an adjustable bolster on a seat of a vehicle, comprising:

sensing a first parameter of the vehicle;

sensing a second parameter of the vehicle;

retrieving a first threshold$_{low}$ for the first parameter, a first threshold$_{high}$ for the first parameter, a second threshold$_{low}$ for the second parameter, and a second threshold$_{high}$ for the second parameter, wherein the first threshold$_{low}$<first threshold$_{high}$ and wherein the second threshold$_{low}$<second threshold$_{high}$; and increasing the engagement of the adjustable bolster if the first parameter≧first threshold$_{low}$ and the second parameter≧second threshold$_{high}$ or if the first parameter≧first threshold$_{high}$ and the second parameter≧second threshold$_{low}$.

2. The method of claim 1 further comprising maintaining the engagement of the adjustable bolster if first threshold$_{low}$≦first parameter<first threshold$_{high}$ and second threshold$_{low}$≦second parameter<second threshold$_{high}$.

3. The method of claim 2 wherein said sensing a first parameter includes sensing a steering angle of a steering device of the vehicle.

4. The method of claim 3 wherein said sensing a second parameter includes sensing a speed of the vehicle.

5. The method of claim 2 wherein said sensing a first parameter includes sensing a lateral acceleration of the vehicle.

6. The method of claim 5 wherein said sensing a second parameter includes sensing a yaw rate of the vehicle.

7. The method of claim 1 further comprising retrieving a first threshold$_{med}$ for the first parameter and a second threshold$_{med}$ for the second parameter, wherein the first threshold$_{low}$<first threshold$_{med}$<first threshold$_{high}$ and wherein the second threshold$_{low}$<second threshold$_{med}$<second threshold$_{high}$.

8. The method of claim 7 further comprising increasing the engagement of the adjustable bolster if the first parameter≧first threshold$_{med}$ and the second parameter≧second threshold$_{med}$.

9. The method of claim 8 wherein said sensing a first parameter includes sensing a steering angle of a steering device of the vehicle.

10. The method of claim 9 wherein said sensing a second parameter includes sensing a speed of the vehicle.

11. The method of claim 8 wherein said sensing a first parameter includes sensing a lateral acceleration of the vehicle.

12. The method of claim 11 wherein said sensing a second parameter includes sensing a yaw rate of the vehicle.

13. The method of claim further comprising retrieving a first deactivation threshold$_{high}$ for the first parameter, a first deactivation threshold$_{low}$ for the first parameter, a second deactivation threshold$_{high}$ for the second parameter, and a second deactivation threshold$_{low}$ for the second parameter, wherein the first deactivation threshold$_{low}$<first threshold$_{low}$, the first deactivation threshold$_{high}$<first threshold$_{high}$, the second deactivation threshold$_{low}$<second threshold$_{low}$, and the second deactivation threshold$_{high}$<second threshold$_{high}$.

14. The method of claim 13 further comprising decreasing the engagement of the adjustable bolster if the first parameter$\leq$first deactivation threshold$_{low}$, or if the second parameter$\leq$second deactivation threshold$_{low}$, or if the first parameter$\leq$first deactivation threshold$_{high}$ and the second parameter$\leq$second deactivation threshold$_{high}$.

15. The method of claim 14 wherein said sensing a first parameter includes sensing a steering angle of a steering device of the vehicle.

16. The method of claim 15 wherein said sensing a second parameter includes sensing a speed of the vehicle.

17. The method of claim 14 wherein said sensing a first parameter includes sensing a lateral acceleration of the vehicle.

18. The method of claim 17 wherein said sensing a second parameter includes sensing a yaw rate of the vehicle.

19. The method of claim 1 wherein said retrieving includes retrieving from a memory device.

* * * * *

UNITED STATES PATENT AND TRADEMARK OFFICE
CERTIFICATE OF CORRECTION

PATENT NO. : 6,629,715 B2
DATED : October 7, 2003
INVENTOR(S) : Pahngroc Oh et al.

It is certified that error appears in the above-identified patent and that said Letters Patent is hereby corrected as shown below:

Column 5,
Line 3, after "method of claim" insert -- 1 --.

Signed and Sealed this

Ninth Day of August, 2005

JON W. DUDAS
*Director of the United States Patent and Trademark Office*